United States Patent [19]

Futamura et al.

[11] Patent Number: 5,330,409
[45] Date of Patent: Jul. 19, 1994

[54] CASSETTE CHANGING APPARATUS FOR INDEX-FEEDING MACHINING SYSTEMS

[75] Inventors: Shoji Futamura; Chikara Murata, both of Kawasaki, Japan

[73] Assignee: Institute of Technology Precision Electrical Discharge, Kanagawa, Japan

[21] Appl. No.: 991,100

[22] Filed: Dec. 16, 1992

[30] Foreign Application Priority Data

Dec. 20, 1991 [JP] Japan .................................. 3-337348

[51] Int. Cl.⁵ ............................................ B23Q 3/155
[52] U.S. Cl. ......................................... 483/29; 72/442; 83/563
[58] Field of Search ................. 483/28, 29, 33 Q, 335, 483/564.2, 758, 793; 72/449, 446; 83/563

[56] References Cited

U.S. PATENT DOCUMENTS

3,841,141 10/1974 Rachwal ............................... 483/28
3,921,887 11/1975 Maehara et al. .................. 483/28 X
4,461,068 7/1984 Schneider et al. ..................... 483/29

Primary Examiner—F. R. Bilinsky
Attorney, Agent, or Firm—McGlew & Tuttle

[57] ABSTRACT

Cassette changing apparatus for index-feed machining systems having such a construction that a plurality of machining units, in which cassettes having machining means are provided, are disposed at predetermined intervals in the workpiece feeding direction in accordance with a plurality of machining processes; the cassette changing apparatus comprising a cassette transfer unit adapted to be movable in such a direction as to intersect with the workpiece feeding direction on a plane, and a cassette holder adapted to be approachable to and detachable from an index-feed machining system; a cassette being extracted from the index-feed machining system and housed in the cassette holder by means of the cassette transfer unit, and then another cassette holder housing a new cassette being moved to a loading position and mounted on the machining unit by means of the cassette transfer unit.

7 Claims, 9 Drawing Sheets

CASSETTE CHANGING APPARATUS FOR INDEX-FEEDING MACHINING SYSTEMS

FIELD OF THE INVENTION

This invention relates to cassette changing apparatus of index-feed machining systems for changing cassettes constituting machining units in an index-feed machining system which sequentially performs punching, bending, drawing and other machining operations on a workpiece in a single system. Each operation being performed in a set of machining units by index feeding the workpiece from one process to the succeeding process where a new machining operation is effected on the workpiece, and all machining operations are completed in the final process.

BACKGROUND OF THE INVENTION

Manufacturing sheet-metal products of a predetermined shape by performing punching, bending, drawing, compressing and other forming operation on a sheet material, such as a steel sheet, usually involves several machining processes. When manufacturing a large quantity of such a sheet-metal product, a means is known for individually carrying out each machining process or stage in a single machining metal die set, while a workpiece is sequentially fed to the next stage to perform a new machining operation on the workpiece until the entire machining process is completed in the final stage. This type of machining die is generally called the progressive die. Since the progressive die can produce one piece of sheet metal product at every pressing stroke of the press, it has been widely used because of high efficiency.

The conventional type of progressive die, as described above, has various advantages, such as higher production rate, shorter delivery from the charging of workpiece through the completion of machining, less work-in-progress in the intermediate processes of the entire press machining, and volume production by a small number of operators. However, it has the following disadvantages. That is, since the progressive die has such a construction that a plurality of punch-die pairs are incorporated in a single metal die, the construction of the die becomes extremely complex, requiring high precision levels of die manufacturing technology, prolonged manufacturing time and high manufacturing cost.

When repairing a partly damaged die, or adjusting the die, it is necessary to disassemble the entire die. These operations are complicate and troublesome, requiring much time and labor. In a production setup to manufacture small quantities of a wide variety of products, if specially designed dies have to be prepared at every slight change in the shape and dimensions of workpieces, the increasing need for the so-called FMS production system in recent years could not be met.

To solve these problems, the present applicant filed earlier a patent application for an index-feed machining system having a simple construction and capable of easily performing partial adjustments. (Japanese Patent Application No. 121760/1989, 121761/1989, etc.) The present invention relates to a cassette changing apparatus, which represents a further improvement made on the basis of these improvement inventions and is intended to reduce substantially the retooling time of the index-feed machining system.

Figure 1:
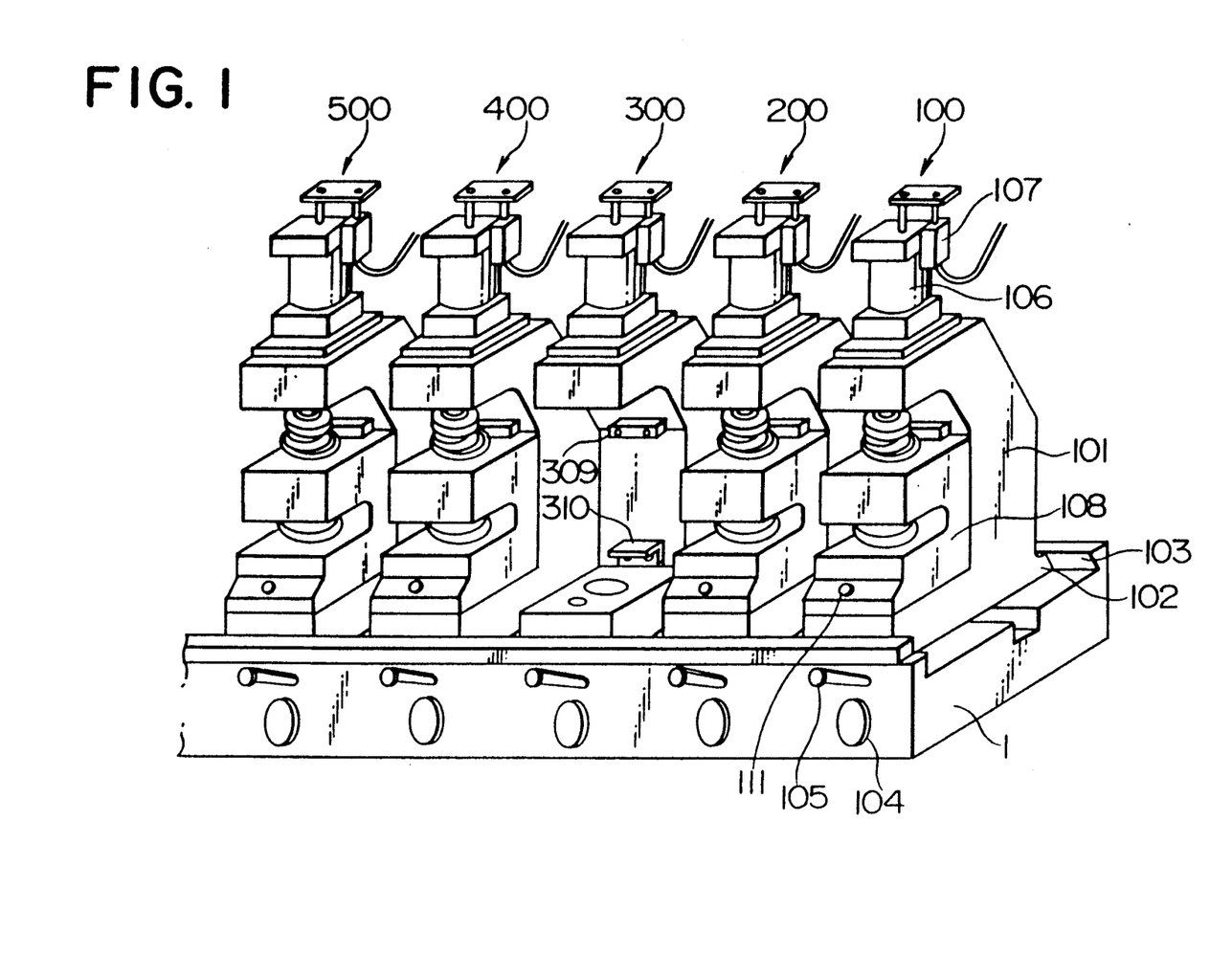
FIG. 1 is a perspective view illustrating an index-feed machining system on which this invention is based.

FIG. 1 is a perspective view illustrating an index-feed machining system to which this invention is applied. In FIG. 1, numerals 100–500 refer to machining units disposed on a base 1 at intervals of 2 P (P: a feeding pitch of workpiece), for example, in the feeding direction of a workpiece (not shown). These machining units 100–500 have punch/die pairs corresponding to a plurality of machining processes. Now, description will be made about the construction taking the machining unit 100 as an example. Numeral 101 refers to a machining unit proper formed into an essentially U shape having at the lower end an integrally formed dovetail 102, which is engaged with a dovetail groove 103 provided on the base 1 so as to allow the movement of the machining unit 101 to be adjusted in the feeding direction of the workpiece and to be constrained in the direction normal to the workpiece feeding direction. Numeral 104 refers to a movement adjusting device; 105 to a clamp device; 106 to a hydraulic cylinder provided on the upper end of the machining unit proper 101; and 107 to a position measuring device provided on the side surface of the hydraulic cylinder 106.

Numeral 108 refers to a cassette formed into an essentially U shape and having on the upper part thereof a punch or die (both not shown) in a vertically movable manner, and on the lower part thereof a die or punch (both not shown) mating with the punch or die described above; the cassette 108 being detachable. The cassette 108 is positioned by engaging positioning members 309 and 310, as will be shown with reference to a machining unit 300. Numeral 111 refers to a clamp screw. That is, the cassette 108 can be positioned at a predetermined location by fitting the cassette 108 to the machining unit proper 101 by means of a positioning member (not shown. Refer to numerals 309 and 310 in the machining unit 300.), and fixedly fitted to that location by tightening the clamp screw 111. After the cassette 108 is fixed, an operating lever (not shown) of the hydraulic cylinder 106 is connected to the vertically movable punch or die, as described above.

Figure 2A:
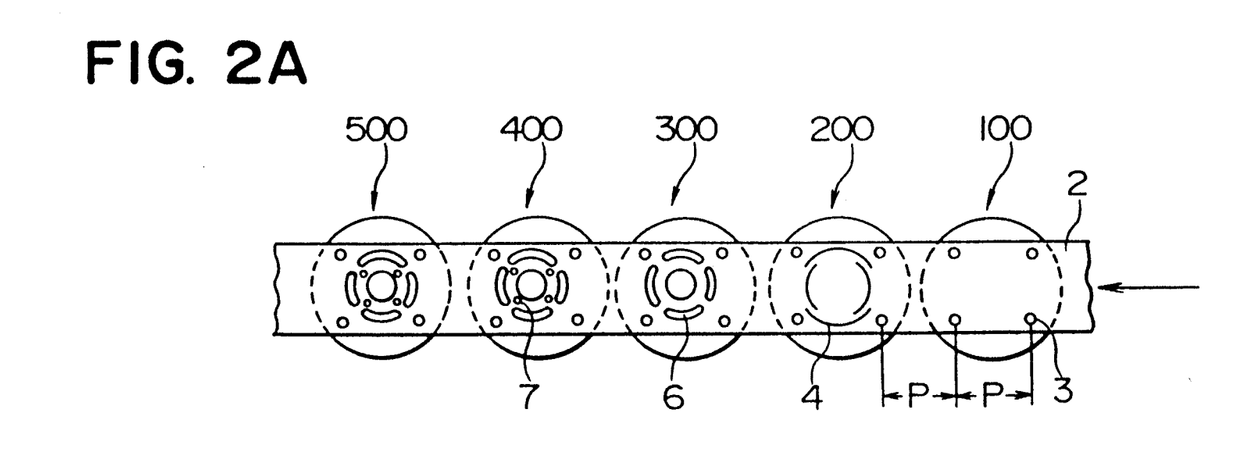
FIGS. 2A and 2B are a plan view and cross-sectional view illustrating the state of machining a workpiece.
Figure 2B:
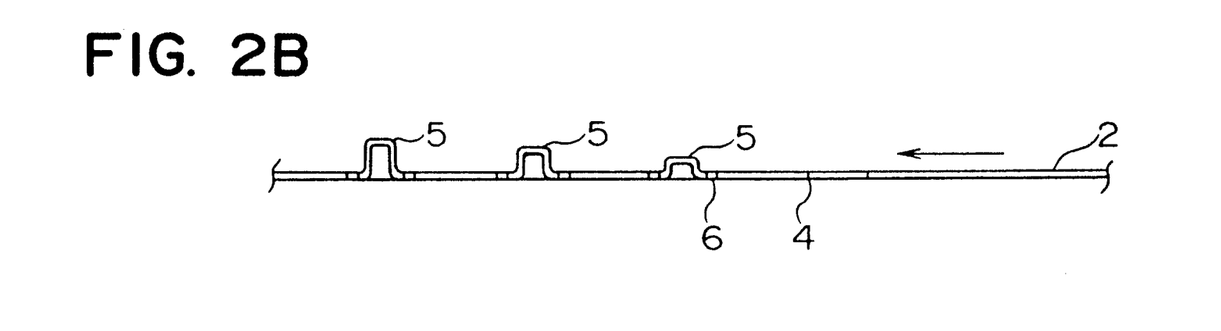

FIGS. 2A and 2B are diagrams of assistance in explaining the machining state of a workpiece. FIG. 2A is a plan view and FIG. 2B a cross-sectional view. Like parts are indicated by like numerals used in FIG. 1 above. In FIGS. 2A and 2B, numeral 2 is a workpiece that is intermittently indexed at intervals of P in the direction shown by an arrow in the figure. That is, the workpiece 2 is indexed in a gap between a pair of punch and die provided on the cassette 108 (the same applies to the other cassettes) in FIG. 1. In FIGS. 1, and 2A and 2B, the machining units 100–500 correspond with the machining process of pilot holes 3, the machining process of arc-shaped slits 4, and the first and third drawing processes.

The machining unit 100 has a punch and die for piercing the pilot holes 3, and guides (not shown) engaging with the pilot holes 3 at positions P in the feeding direction of a workpiece 2. Thus, every time the machining unit 100 is operated, the pilot holes 3 are sequentially machined and the guides are engaged with the machined pilot holes 3 to prevent the workpiece 2 from being unwantedly shifted in position so as to maintain machining accuracy.

The machining unit 200 machines arc-shaped slits 4, and the machining unit 300 performs the first drawing operation to form a cup-shaped projection 5 on the workpiece 2, and expands the width of the arc-shaped slits 4 to form into arc-shaped grooves 6. Moreover, the machining unit 400 performs the second drawing operations and the machining of flange holes 7, and increases the height of the projection 5. The machining unit 500 carries out the third drawing operation to form the projection 5 into a predetermined height. And then, trimming and other machining operations are carried out to obtain cup-shaped sheet-metal products of a predetermined size. Needless to say, positioning is performed for the machining units 200–500 by providing guides engaging with the pilot holes 3 to maintain predetermined accuracy.

The index-feed machining system of the aforementioned construction has a simpler construction than the conventional index-feed machining systems, and various advantages, such as the ease of manufacture and high-efficiency machining in production systems for producing a wide variety of products in small quantities. However, it has the following problems, too.

That is, when changing individual machining processes in the index-feed machining, the machining units 100–500 corresponding to the present machining processes, for example, have to be changed to machining units corresponding to new machining processes. In such a case, although the contents of machining units can be changed merely by changing the cassettes 108 fitted to the machining units 100–500, the operation of the index-feed machining system has to be interrupted while the cassettes in a plurality of machining units are replaced with new ones.

When the aforementioned cassettes are replaced with new cassettes, trial operations are needed to check for the degree of engagement between the punches and dies constituting cassettes, the state of machining the workpiece, dimensional accuracy. Furthermore, when the intervals of the new machining units are changed, positioning and feeding pitch and other adjustments have to be made. While these trial operations, adjustments and other retooling operations are performed, the index-feed machining operation on the workpiece must be discontinued. Needless to say, the index-feed machining system of the aforementioned construction has an effect of substantially reducing the time required for retooling, compared with the conventional index-feed machining system. In order to further improve productivity, however, it is necessary to further reduce the time required for retooling, thereby increasing the operation time of the index-feed machining system.

SUMMARY OF THE INVENTION

This invention is intended to solve these problems. It is an object of this invention to provide a cassette changing apparatus for index-feed machining systems that can substantially improve the operating rate of the index-feed machining system.

DETAILED DESCRIPTION OF THE EMBODIMENTS

Figure 3:
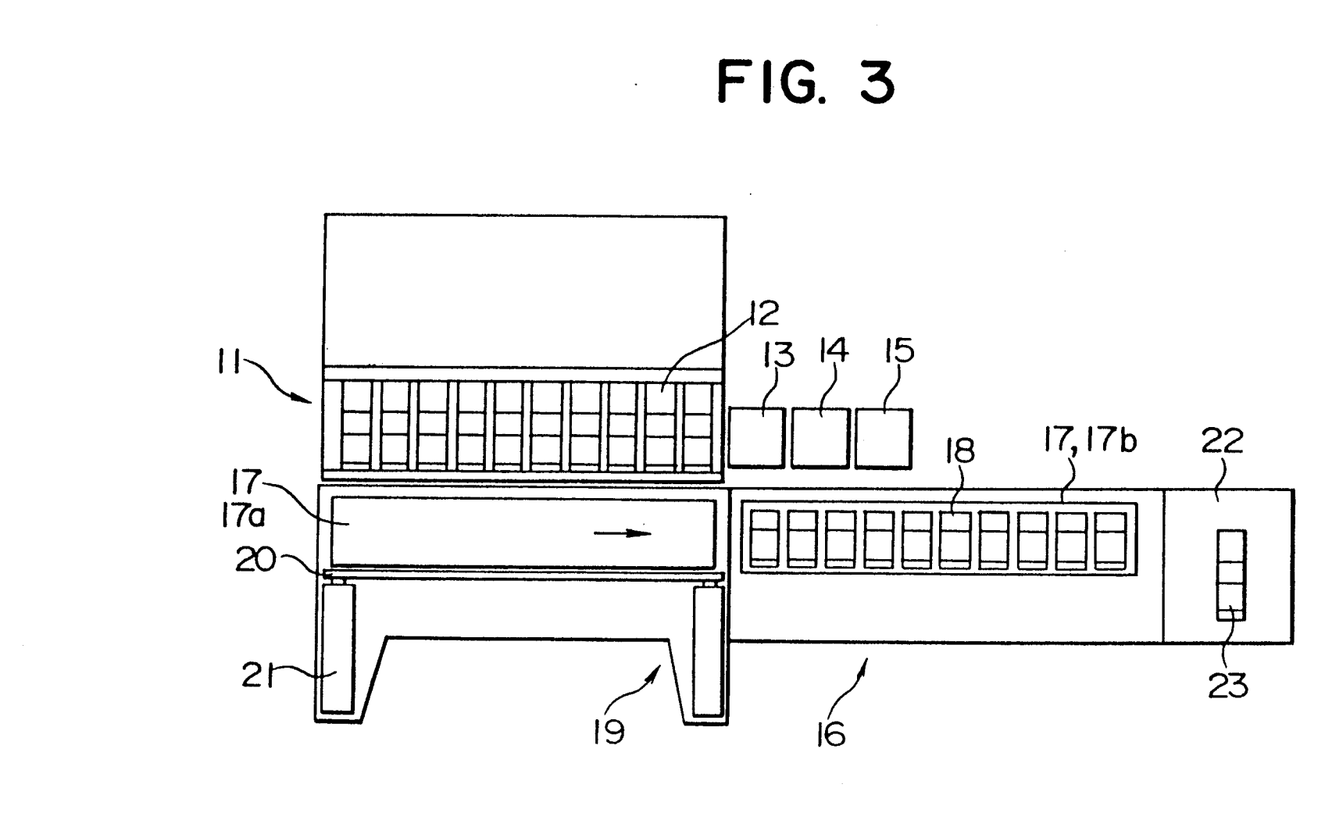
FIGS. 3 and 4 are a plan view and front view illustrating an embodiment of this invention.
Figure 4:
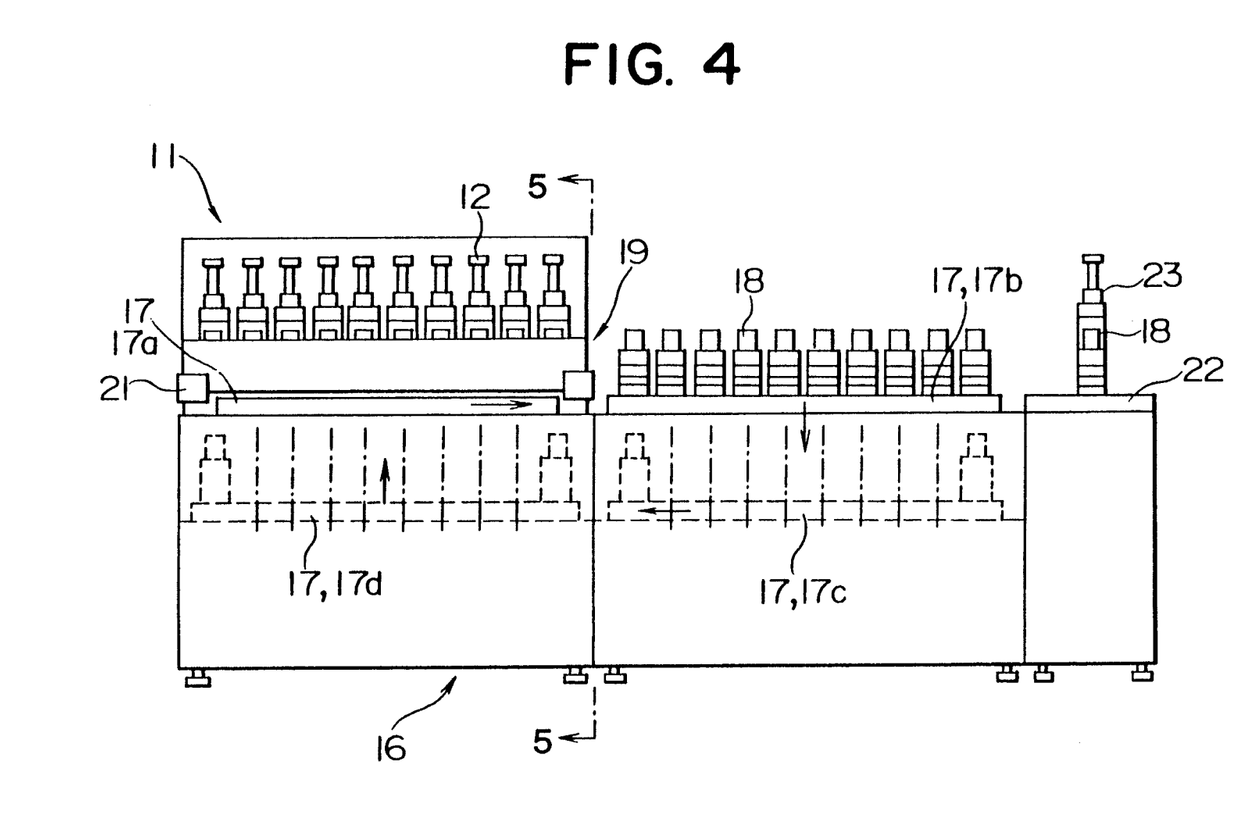
Figure 5:
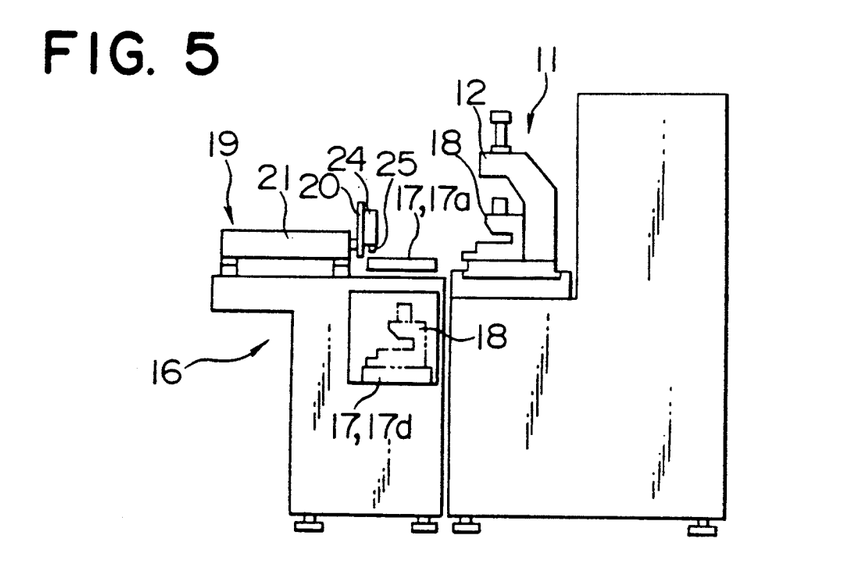
FIG. 5 is a diagram viewed from the direction shown by arrow line 5—5 in FIG. 4.

FIGS. 3 and 4 are a plan view and front view illustrating an embodiment of this invention. FIG. 5 is a diagram viewed from the direction shown by arrow line 5—5 shown in FIG. 4. In FIGS. 3 through 5, numeral 11 refers to an index-feed machining system in which ten units, for example, of machining units 12 are disposed corresponding to a plurality of machining processes at intervals of mP (m being an arbitrary positive integer, P being a feeding pitch of a workpiece (not shown) in the feeding direction (the direction from right to left in FIGS. 3 and 4) of the workpiece. In this case, intervals at which the machining units 12 are disposed should preferably be set to slightly smaller than mP. Numeral 13 refers to an index-feeding device, 14 to a joining device, and 15 to a workpiece feeding device, each provided on the upstream side in the feeding direction of the workpiece in the index-feed machining system.

Numeral 16 refers to a cassette changing apparatus provided in the vicinity of the front side of the index-feed machining system 11. Numeral 17 refers to a pallet formed into a flat plate shape, for example, in such a manner that the cassettes 18 to be provided in the machining units 12 constituting the index-feed machining system 11 can be housed and held at predetermined intervals. Numerals 17a, 17b, 17c and 17d indicate the locations of the pallet 17. That is, the pallet 17 is formed in such a manner as to be moved in the sequence of 17a→17b→17c→17d→17a—by means of a pallet transfer device (not shown).

Numeral 19 refers to a transfer unit provided facing the front side of the index-feed machining system 11 on the cassette changing apparatus 16, having an engaging member 20 formed in such a manner as to be engaged with and disengaged from an engaging portion provided at the end of the cassette 18, as will be described later, and formed in such a manner that the engaging member 20 can be approached to and separated from the index-feed machining system 11. The direction in which the engaging member 20 is approached to and separated from the index-feed machining system 11 should preferably be the direction intersecting, or more preferably intersecting orthogonally, the feeding direction of the workpiece (not shown). Numeral 22 refers to a preset stand provided in the vicinity of the cassette changing apparatus 16. Numeral 23 indicates a trial machining unit formed identically to the machining units 12 constituting the index-feed machining system 11 and provided on the preset stand 22.

With the aforementioned construction, the operation of this invention will be described in the following. First, a cassette 18 for a new machining operation is fitted to the trial machining unit 23 provided on the preset stand 22 to adjust the engaging state of the punch and die (both not shown) constituting the cassette 18 and perform trial machining by charging a workpiece (not shown) for a new machining operation, thereby adjusting the machining state until predetermined accuracy can be obtained. The machining conditions and other data obtained are entered in an NC control device (not shown) as necessary. Upon completion of the aforementioned trial machining and adjustment operations, the cassette 18 is removed from the trial machining unit 23, and housed and held at a predetermined location on the pallet 17 provided at the location 17b of the cassette changing apparatus 16.

These trial machining and adjustment operations are performed on all the cassettes 18 for new machining operations, and the cassettes 18 are sequentially housed and held on the pallet 17 located at the location 17b. The pallet 17 should preferably have positioning grooves, for example, at predetermined intervals so that a plurality of the cassettes 18 can match with the feeding pitch mP for new machining operations. The pallet 17 holding the cassettes 18 is lowered down to the location 17c via a pallet transfer device (not shown) and moved to the left, as shown in FIG. 4, and stopped and held on standby when it reaches the standby location 17d.

Figure 6:
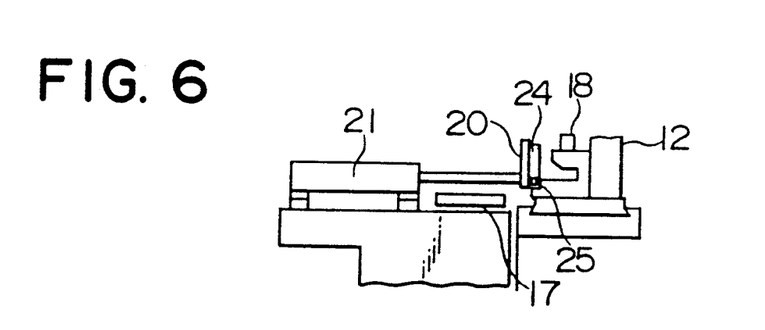
FIGS. 6 and 7 are diagrams of assistance in explaining the operating state of the transfer unit shown in FIG. 5.
Figure 7:
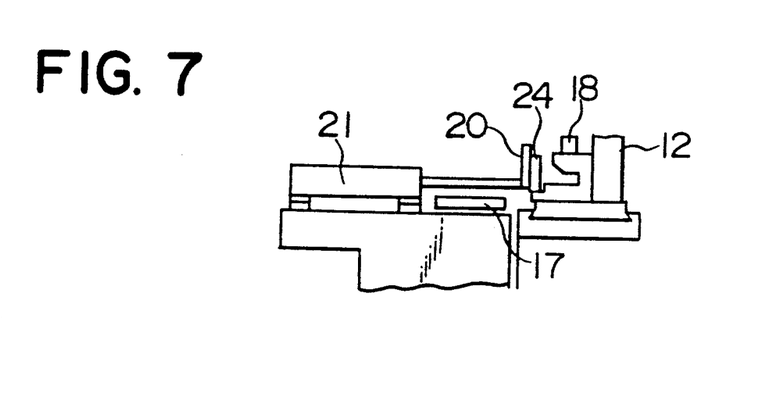

Upon completion of predetermined operations in the index-feed machining system 11 now in operation, the transfer unit 19 is operated to move the engaging member 20 to the cassette 18. FIGS. 6 and 7 are diagrams of assistance in explaining the operating state of the transfer unit 19 in FIG. 5. Like parts are indicated by like numerals in FIGS. 3 through 5. In FIGS. 5 through 7, numeral 24 indicates an actuating member provided on the engaging member 20 and having a vertically movable pin 25. Consequently, as the actuating member 24 provided on the engaging member 20 is approached to the end of the cassette 18, as shown in FIG. 6, the pin 25 comes immediately above an engaging hole (not shown) provided on the end of the cassette 18. By actuating the actuating member 24 at this location, the pin 25 can be caused to engage with the aforementioned engaging hole. (Refer to FIG. 7.)

After the pin 25 is caused to engage with the engaging hole on the cassette 18 provided on the machining unit 12 constituting the index-feed machining system 11, the state of locking the cassette 18 to the machining unit 12 is released by actuating a clamp (not shown) formed in such a manner as will be described later. Then, the cylinder 21 is operated to extract the cassette 18 from the machining unit 12 and place it on an empty pallet 17 disposed in advance on the location 17a on the front side or loading location of the index-feed machining system 11. After the cassette 18 is housed and held on the pallet 17, the actuating member 24 is operated in the reverse direction to extract the pin 25 from the engaging hole on the cassette 18.

Next, the pallet 17 is moved from the location 17a to the location 17b, as shown in FIGS. 3 and 4, via the pallet transfer device (not shown). The cassette 18 that has been housed and held on the pallet 17 after the completion of machining is subjected to maintenance and inspection, and transferred to a predetermined storage site. After the pallet 17 has been moved, the pallet 17 that has been on standby at the location 17d is lifted to cause a cassette 18 for a new machining operation to face the front of the index-feed machining system 11. In the state shown in FIG. 5, the pin 25 can be caused to engage with an engaging hole (not shown) of the cassette 18 for the new machining operation (not shown. Refer to the cassette 18 on the pallet 17 at the location 17d.) housed and held on the pallet 17 by actuating the actuating member 24.

By operating the cylinder 21 in this state, the cassette 18 for the new machining operation can be installed in the machining unit 12, and then fixedly fitted to the machining unit 12 by actuating a clamp (not shown). Thereafter, index-feed machining can be performed with the new cassette by operating the actuating member 24 in the reverse direction, extracting the pint 25 from the engaging hole on the cassette 18, returning the transfer unit 19 to the state shown in FIGS. 3 through 5 by operating the cylinder 21 in the reverse direction, and then operating the index-feed machining system 11.

In FIGS. 3 and 4, although an example where the machining units 12 are disposed at equal intervals is shown, the intervals of disposing the machining units 12 can of course be selected arbitrarily in accordance with the manner in which index-feed machining is carried out on the workpiece. In this case, the extraction and installation of the cassette 18 in the machining unit 12 may be performed in the state where the machining units 12 are disposed at equal intervals, or the machining units 12 may be moved to predetermined locations after the cassettes 18 are installed on the machining units 12. Furthermore, after the cassettes 18 are disposed on the pallet 17 to correspond to the state where the machining units 12 are disposed at predetermined intervals, the cassettes 18 are installed in the same manner as described above.

Description has also been made about the use of the pallet 17 formed into a flat plate as a cassette holder housing and holding the cassette 18, but a cassette holder of an endless conveyor-shaped rotatable type, like a tool holder used in a machining center, may achieve the same effect. In this case, the range of rotation may be either two-dimensional or three-dimensional, or a combination of both.

Furthermore, the cassette 18 constituting the machining unit 12 may be changed either one by one, or by a fixed number or the full number thereof en block at one time, and these changing operations can be performed either manually or automatically in accordance with a predetermined program. Although description has been made about an example where the pin 25 of the actuating member 24 is engaged with an engaging hole provided on the end of the cassette 18, these engaging means may not be limited to a combination of hole and pin, but engaging means of other construction can achieve the same effect so long as the transfer unit 19 and the cassette 18 are engageable and disengageable.

Upon completion of trial machining and adjustment in the trial machining unit 23, the workpiece machined in the trial machining operation is fitted to a plurality of cassettes 18 housed and held in the pallet 17, the cassettes 18 may be inserted into the machining units 12, together with the workpiece. In this case, all the machining units can be put into operation simultaneously from the very start after the cassettes 18 are changed by welding the upstream end of the workpiece to a new workpiece by means of a welding device 14.

Figure 8:
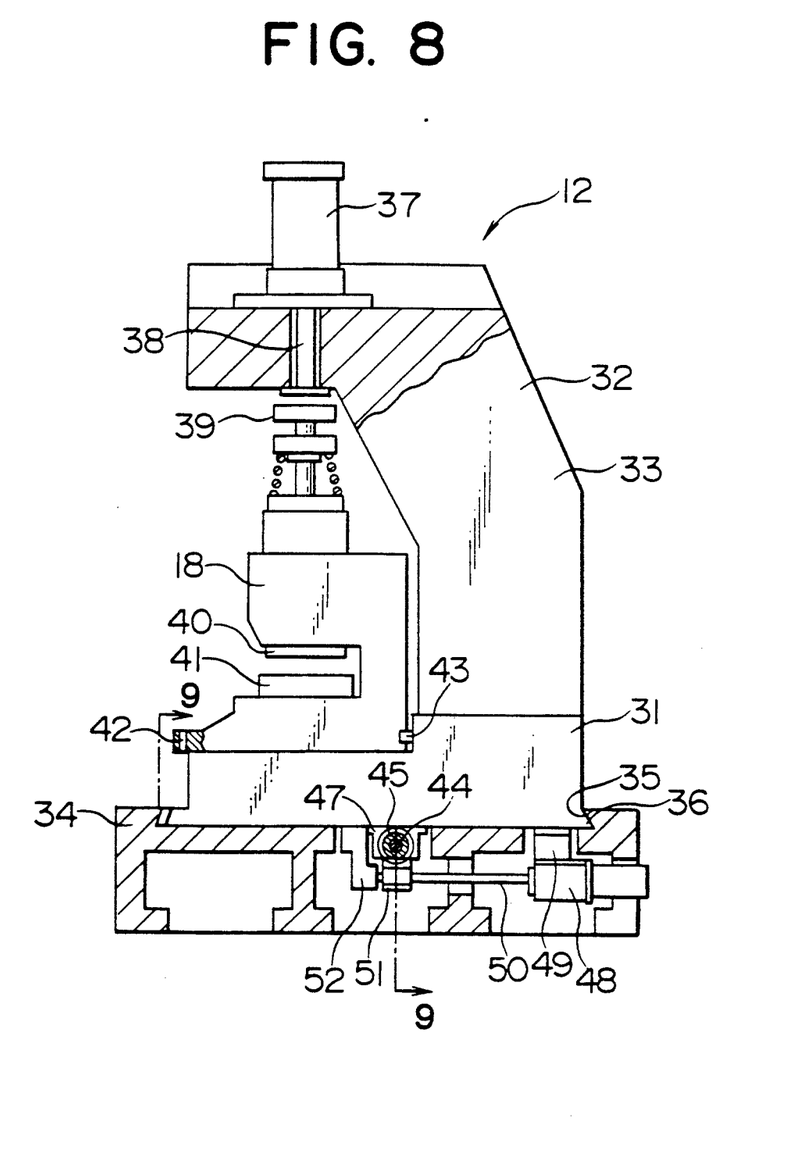
FIG. 8 is an enlarged side view illustrating an example of machining unit in FIG. 5.
Figure 9:
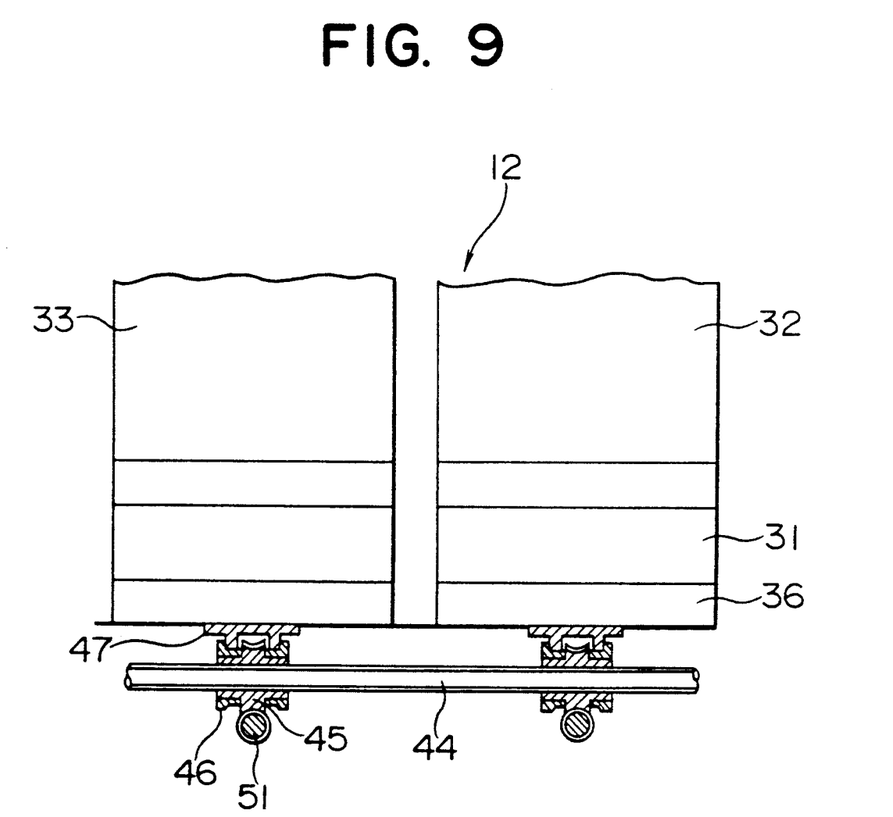
FIG. 9 is an enlarged cross-sectional view taken along line 9—9 in FIG. 8.

FIG. 8 is an enlarged side elevation illustrating an example of machining unit in FIGS. 3 through 5; FIG. 9 is an enlarged cross-sectional view taken along line 9—9 in FIG. 8. Like parts are indicated by like numerals shown in FIGS. 3 through 7. In FIGS. 8 and 9, the machining unit 12 comprises a machining unit proper 33 formed by integrally fastening a unit base 31 to a column 32 formed into an essentially inverted L-shape with bolts (not shown), for example, and a cassette 18 detachably fitted to the machining unit proper 33. The machining unit proper 33 is slidable fitted to a dovetail groove 35 provided on a base 34 via a dovetail 36.

Numeral 37 refers to a hydraulic cylinder provided on the upper part of the column 32 formed in such a manner that a punch head 39 provided on the cassette 18 can be operated via a rod 38. Numeral 40 refers to a punch holder; 41 to a die holder; both provided on the cassette 18 for holding a punch and die (both not shown), respectively. Numeral 42 refers to an engaging hole; 43 to a positioning members provided at the front and rear ends of the cassette 18. The engaging hole 42 is formed in such a manner that the pin 25 shown in FIGS. 3 and 4 can be engaged with and disengaged from the engaging hole 42 smoothly. The positioning member 43 is formed in such a manner that the punch and die can be placed at predetermined locations in the state where the cassette 18 is inserted into and brought into contact with the unit base 31.

Numeral 44 refers to a threaded shaft provided in the base 34 along the direction in which the machining unit 12 is disposed. Worm gears 45 of the same number as the number of the machining units 12 are rotatably engaged with the threaded shaft 44. Numeral 46 refers to a flange member fixedly fitted to both axial ends of the worm gear 45. Numeral 47 refers to a driven member formed in such a manner as to hold the worm gear 45, fitted to the lower end of the unit base 31 of the machining unit 12, and slidably engaged with the flange member 46. Numeral 48 refers to a servo motor or a base positioning means fitted to the lower end of the unit base 31 via a bracket 49; with the worm 51 provided at the end of the output shaft 50 being engaged with the worm gear 45. The end of the output shaft 50 is supported by a bracket 52 provided at the lower end of the unit base 31.

With the aforementioned construction, by operating the hydraulic cylinder 37, the punch head 39 is driven downward by the rod 38 to cause the punch and die (both not shown) held by the punch holder 40 and the die holder 41, respectively, to be engage with each other. Thus, piercing or blanking and other machining operations can be performed on the workpiece placed between the punch and die. As a result, the aforementioned index-feed machining can be performed by the index-feed machining system formed by disposing a plurality of machining units 12 in the workpiece feeding direction.

When changing the cassette 18, the cassette 18 can be smoothly detached from and attached to the machining unit 12 by engaging the pin 25 as shown in FIGS. 5 and 6 with the engaging hole 42 provided at the front end of the cassette 18. To install the cassette 18 in the machining unit 12, the punch and die can be disposed at predetermined locations merely by advancing the cassette 18 until the positioning member 43 comes in contact with the unit base 31. To adjust the position of the machining unit 12 or return the machining unit 12 to its respective original location after the cassette 18 is inserted and fixedly fitted to the unit base 31, the servo motor 48 is driven by signals from an NC control device (not shown) to cause the output shaft 50, the worm 51 and the worm gear 45 to rotate by a predetermined number of rotation. As a result, the worm gear 45 is moved on the threaded shaft 44, causing the machining unit 12 to move to a predetermined location via the driven member 47.

In FIG. 9, description has been made about an example where worm gears of the same number as the number of machining units 12 are fitted to a single common threaded shaft 44 as a means to adjust the movement of the machining unit 12 to a predetermined location. The threaded shaft 44, however, may be split into the number of machining units 12, and each of the split threaded shafts may be engaged with a female thread provided on each machining unit 12 to cause the split threaded shafts to rotate to adjust the movement of the machining units 12.

Figure 10:
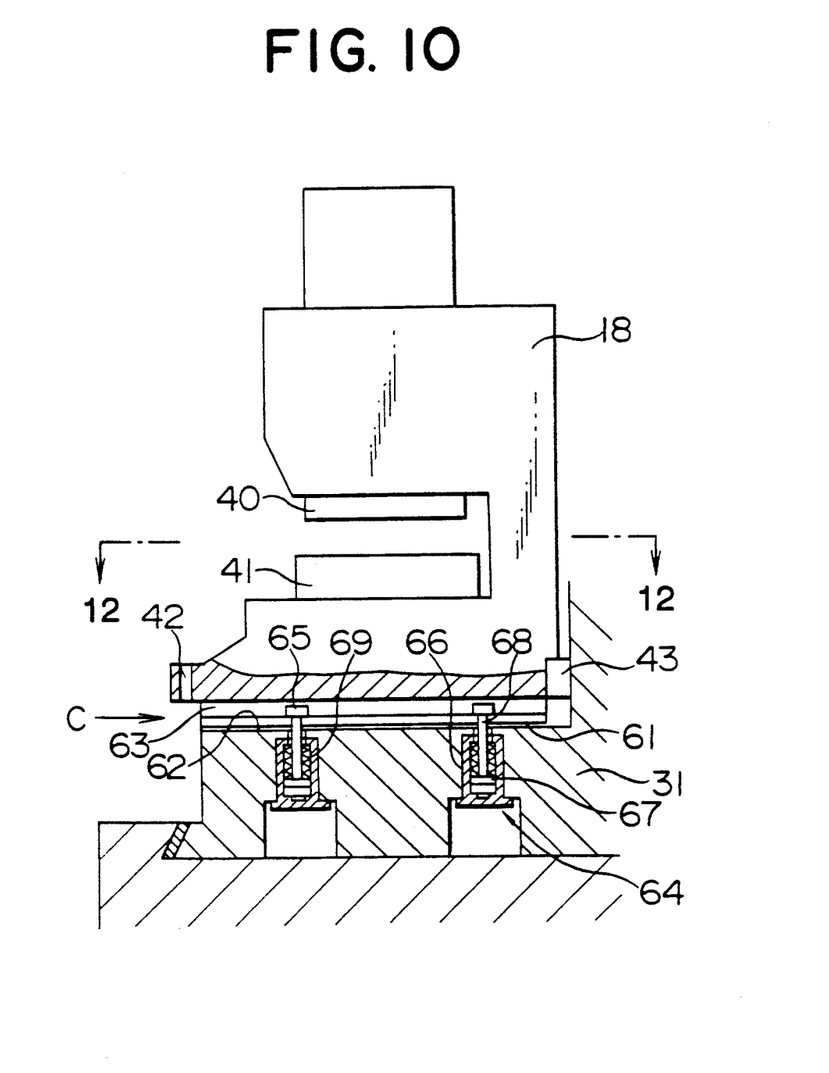
FIG. 10 is a partly cross-sectional enlarged side view illustrating the cassette and the vicinity thereof shown in FIG. 8.
Figure 11:
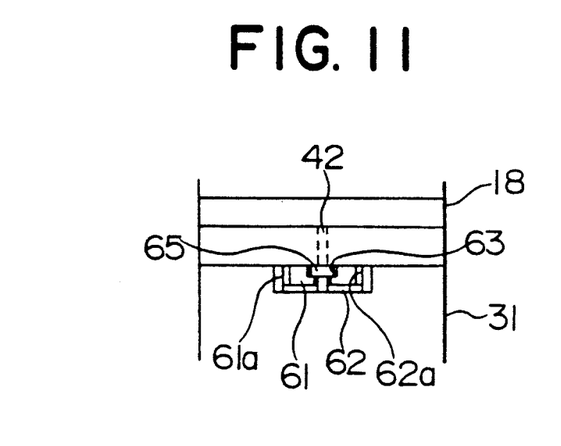
FIG. 11 is a diagram viewed from the C direction shown by arrows in FIG. 10.
Figure 12:
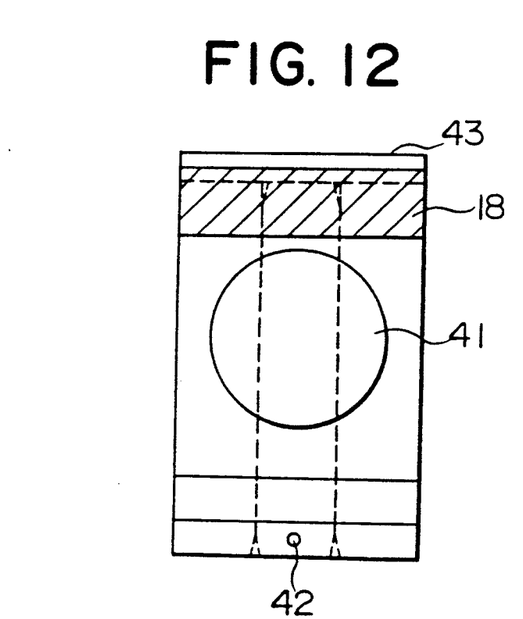
FIG. 12 is a cross-sectional view taken along line 12—12 in FIG. 10.

FIG. 10 is a partly cross-sectional enlarged side view illustrating the cassette 18 in FIG. 8 and the neighborhood thereof, FIG. 11 is a diagram viewed from the direction C in FIG. 10, and FIG. 12 is a cross-sectional view taken along line 12—12 in FIG. 10. Like parts are indicated by like numerals in FIG. 8. In FIGS. 10 through 12, numeral 61 refers to a ridge of a rectangular shape in cross section, for example, provided integrally on the bottom of the cassette 18 along the direction in which the cassette 18 is engaged with and disengaged from the machining unit 12. Both side surfaces of the ridge 61 form reference surfaces 61a. Numeral 62 refers to a groove, with the opening thereof facing the upper surface of the unit base 31, provided in such a manner that the ridge 61 is slidable in the groove 62. consequently, both sides of the groove 62 form reference surfaces 62a slidably coming in close contact with the reference surfaces 61a of the ridge 61.

Numeral 63 refers to a T groove provided approximately at the center of the ridge 61. Numeral 64 refers to a clamp provided on the unit base 31 in such a manner that a clamp pawl 65 can be relatively moved in the T groove 63. Numeral 66 refers to a cylinder incorporating a piston 67; the clamp pawl 65 being fixedly fitted to the free end of a piston rod 68. The side surfaces of the end of the ridge 61 in the longitudinal direction, and the front end of the groove 62 should preferably be tapered. The cylinder 66 is formed to work or operate with compressed air or hydraulic pressure. Numeral 69 refers to a spring fitted so as to preload the piston rod 68 downward.

With the aforementioned construction, after positioning has been completed by inserting the cassette 18 into the unit base 31 in the state where the cylinder 66 is operated, the cassette 18 can be fixedly fitted to the unit base 31 by releasing the operation of the cylinder 66, pressing the clamp pawl 65 downward via the spring 69 and the piston rod 68, and engaging the clamp pawl 65 with the T groove 63. The cassette 18 can be moved because the clamp pawl 65 can be relatively moved in the T groove 63 by operating the cylinder 66. To facilitate the engagement and disengagement of the cassette 18 with and from the unit base 31, it is recommended that part of the side surfaces of the ridge 61 and groove 62 are tapered, as described above.

The type of machining operations possible with the machining unit 12 may not be limited to piercing, blanking, etc. but the machining unit 12 may also apply to drawing, bending, compressing operations. The drive means provided in the machining unit 12 may not be limited to the hydraulic cylinder. Not only fluid pressure cylinders using air, water, etc. as the medium, but also drive means other than fluid pressure cylinders can be used.

This invention having the aforementioned construction and operation can prepare and adjust in advance a plurality of cassettes for new machining operations without interrupting the operation of the index-feed machining system now in machining state, and can automatically change cassettes for new and old machining operations in a very short time. This invention can therefore improve substantially the operating rate of the index-feed machining system.

What is claimed is:

1. A cassette-changing apparatus for index-feed machining systems, the apparatus comprising:
   a base;
   a plurality of machining units positioned at predetermined intervals on said base in a workpiece feeding direction;
   a plurality of cassettes, each one of said plurality of cassettes being positionable in one of said plurality of machining units, said plurality of machining units sequentially performing a plurality of machining processes on a workpiece as the workpiece is passed in said workpiece feeding direction through said cassettes positioned in said machining units;
   first and second cassette holders being moveable towards and away from said plurality of machining units, said first and second cassette holders defining a plurality of positioning groove means for housing and holding subsets of said plurality of cassettes and for aligning said subsets of cassettes in said predetermined intervals with said plurality of machining units when said first and second cassette holders are positioned toward said machining units;
   cassette changing means for moving said subsets of cassettes on said first and second cassette holders from a standby location to a loading location;
   transfer means movable in a transfer direction intersecting said workpiece feeding direction and for extracting in said transfer direction one of said plurality of cassettes from one of said plurality of machining units and onto one of said cassette holders in said loading position, said transfer means also for installing in said transfer direction another one of said plurality of cassettes from another one of said holders in said loading position into one of said plurality of machining units, said transfer means including an engaging means for engaging and disengaging with said plurality of cassettes.

2. Cassette changing apparatus for index-feed machining systems as set forth in claim 1, wherein: said transfer direction substantially orthogonally intersects said work-piece feeding direction.

3. Cassette changing apparatus for index-feed machining systems as set forth in claim 1, wherein: said transfer means includes a fluid pressure cylinder for moving in said transfer direction.

4. Cassette changing apparatus for index-feed machining systems as set forth in claim 1, wherein: said first and second cassette holders are formed movably in a substantially vertical plane parallel with said workpiece feeding direction.

5. An apparatus in accordance with claim 1, further comprising:
   trial machining means positioned adjacent said cassette changing means and for aligning one of said subsets of said cassettes for subsequent use in said machining units;
   base positioning means for adjusting positions of said machining units to receive one of said subsets from one of said cassette holders and for adjusting positions of said machining units for said sequential performing of said plurality of machining processes on the workpiece.

6. An apparatus in accordance with claim 5, further comprising:
   control means for recording alignment data from said trial machining means and feeding said alignment data to said base positioning means.

7. A cassette-changing apparatus for index-feed machining systems, the apparatus comprising:
   a base;
   a plurality of machining units positioned at predetermined intervals on said base in a workpiece feeding direction;
   a plurality of cassettes, each of said plurality of cassettes being positionable in one of said plurality of machining units, said plurality of machining units sequentially performing a plurality of machining processes on a workpiece as the workpiece is passed in said workpiece feeding direction through said cassettes positioned in said machining units;
   first and second cassette holders moveable towards and away from said plurality of machining units, said first and second cassette holders defining a plurality of positioning groove means for housing and holding subsets of said plurality of cassettes and for aligning said subsets of cassettes in said predetermined intervals with said plurality of machining units when said first and second cassette holders are positioned toward said machining units;
   cassette changing means for moving said subsets of cassettes on said first and second cassette holders from a standby location to a loading location;
   transfer means movable in a transfer direction intersecting said workpiece feeding direction and for extracting in said transfer direction one of said plurality of cassettes from one of said plurality of machining units and onto one of said cassette holders in said loading position, said transfer means also for installing in said transfer direction another one of said plurality of cassettes from another one of said holders in said loading position into one of said plurality of machining units, said transfer means including an engaging means for engaging and disengaging with said plurality of cassettes;
   trial machining means positioned adjacent said cassette changing means and for aligning one of said subsets of said cassettes for subsequent use in said machining units;
   base positioning means for adjusting positions of said machining units to receive one of said subsets from one of said cassette holders and for adjusting positions of said machining units for said sequential performing of said plurality of machining processes on the workpiece;
   control means for recording alignment data from said trial machining means and feeding said alignment data to said base positioning means.

* * * * *